July 29, 1930.   A. B. FOWLER   1,771,621
ABRADING MACHINE
Filed May 1, 1924   2 Sheets-Sheet 2

INVENTOR.

Patented July 29, 1930

1,771,621

UNITED STATES PATENT OFFICE

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY

ABRADING MACHINE

Application filed May 1, 1924. Serial No. 710,347.

This invention relates to abrading machines and is herein illustrated as embodied in a machine for grinding the chopping knives of jointing machines such as are used for trimming the edges of the shanks of soles.

An example of a jointing machine such as above referred to may be found in United States Letters Patent No. 1,030,605, granted June 25, 1912, to F. H. Perry. As fully explained in said Letters Patent, jointing machines are provided with a trimming knife and a pair of chopping knives. The trimming knife has opposite right and left cutting edges arranged respectively to trim the right and left edges of the shank portion of a shoe sole in the region of the heel breast, the knife blade being curved transversely with respect to its opposite cutting edges to impart a rounded contour to the edge of the sole and the knife moving along the sole edge inwardly toward the heel breast to make its trimming cut. The chopping knives reciprocate in paths parallel to the breast of the heel to cut off the curved chips left by the trimming knife. To insure that the chopping knives will just sever these chips without cutting into the shank beyond the rounded edge cut by the trimming knife, the trimming and chopping knives, while differing in form, have one contour common to both, the cutting edges of the chopping knives being shaped, viewing the knives laterally, to correspond to the transverse curvature of the blade of the trimming knife. To enable the chopping knives to continue to cut as above described it is obviously necessary that they must be ground so as to preserve the above-mentioned identity of contour and a machine for thus grinding the chopping knives is disclosed in United States Letters Patent No. 1,400,767, to F. H. Perry, dated December 20, 1921. In the grinding machine of the Letters Patent just referred to, the trimming knife with which the chopping knives are associated in the jointing machine is utilized as a pattern to control the grinding of the chopping knives so that the latter will be accurately ground to the requisite contour.

One object of the present invention is to provide an improved abrading machine which will be organized to insure even greater accuracy in the grinding of cutters, such as the chopping knives of jointing machines, however abrupt the curvature and however steep the inclination of the cutting edges of these knives, and to accomplish this result without sacrificing any of the advantages characteristic of abrading machines of the type disclosed in the above-mentioned Letters Patent.

With this object in view, one feature of the invention resides in the combination with an abrading element and a work carrier arranged for relative oscillatory movement toward and from each other and also for relative movement in a path transverse to that of said oscillatory movement, of means for controlling the action of the abrading element upon the work, comprising a templet located at the same side of the axis of said oscillatory movement as the abrading element, and at a distance from said axis which is substantially less than the distance between said axis and the work.

By locating the templet nearer the axis of oscillation of the work holder than the work itself, the movement imparted by the templet to the work carrier will be multiplied so that the work will be moved through a greater distance than the portion of the work carrier which engages the templet.

As illustrated, the templet is located substantially half way between the axis of oscillation of the work support and the point of contact of the work with the abrading element and accordingly the work is moved substantially twice as far as the portion of the work carrier which engages the templet. Consequently in designing a templet for use in the illustrated machine to control the grinding of a cutter having a cutting edge of a given curvature, the distance between the high and low points of the templet need be only substantially half as great as the distance between the corresponding points in the edge of the cutter, while the linear distances between the corresponding points (i. e. their abscissas) on the templet and on the work are equal. This gives to the contour of the templet a different shape from that of the work. In other words, the curvature and inclination at different parts of the templet may be made respectively less abrupt and less steep than the curvature and inclination of corresponding parts in the edge of the cutter in any given unit of length. The shape of the templet is thus geometrically dissimilar to the shape of the cutter. As a result, the follower or other portion engageable with the templet will ride more readily and smoothly thereover and increased accuracy in the grinding will be effected. Furthermore, by locating both the abrading element and the templet at the same side of the axis of oscillation of the work carrier, the templet will be directly effective to move the cutter against the abraiding element and will thus control the grinding in a thoroughly reliable manner. Such an arrangement also enables the relatively movable operative parts of the abrading machine to be more compactly disposed and permits the use of a work carrier of simplified construction.

The illustrated machine is designed to grind both the right and left chopping knives of a jointing machine at each grinding operation. To this end the knives are arranged in the grinding machine with their cutting edges opposed so that the cutting edges of the two knives form a single reentrant curve, and the guiding face of the templet is formed with a corresponding convex curvature the height of which is substantially only half as great as the depth of the reentrant curve formed by the edges of the knives.

It is desirable that the same amount of material shall be removed from each knife at each grinding operation so that one knife will not become worn away to such an extent that it will have to be discarded while the other knife is capable of being further used. To insure that the knives of each pair shall be uniformly worn away by successive grinding operations to which they are subjected, means is provided, in accordance with another feature of the invention, for locating the knives of each pair relatively to each other with their curved cutting edges symmetrically disposed, or in other words, with corresponding points in their cutting edges transversely alined in a plane parallel to the axis of the grinding wheel. In the illustrated embodiment of the invention, the knives are mounted upon a knife block with the knife shanks arranged beside each other in the same plane, and the means for relatively locating the knives comprises two gage members in the form of pins which project from the knife block and are adapted to be engaged by the free extremities of the knife shanks.

To compensate for the wearing away of the grinding wheel, it is desirable to provide for adjustment of the knives transversely of the axis of the grinding wheel. In order that such adjustment of the knives shall not result in the grinding of the cutting edges of different pairs of knives to different contours, provision is made, in accordance with a further feature of the invention, for adjusting the knife support and the templet in unison transversely of the axis of the grinding wheel. As illustrated, the knife support and the templet are mounted upon a slide which is vertically adjustable and means is provided for conveniently adjusting the slide, said means preferably being of such character as to maintain any given adjustment of the slide without the use of special locking devices for this purpose.

A further feature of the invention consists in the provision of means for locating the knives in unison relatively to the movable knife support so that the cutting edges of the knives will be beveled at the same angle irrespective of adjustments of the knife slide which may have been made for the purpose of compensating for the wearing away of the grinding wheel. To this end, as herein shown, the knife block is mounted upon a knife block support with provision for adjustment toward and from the grinding wheel and a movable gage is provided for locating the knife block relatively to the knife block support by engagement with the transversely alined inner ends of the cutting edges of the knives. Preferably the gage is pivotally connected with the knife block support and the construction is such that after the gage has been used to locate the knives, it may be swung clear of the knives and retained in an inoperative position where it will not interfere with the grinding operation.

These and other features of the invention, including certain details of construction and combinations of parts, will be described in connection with an illustrative machine and pointed out in the appended claims.

Figure 1:
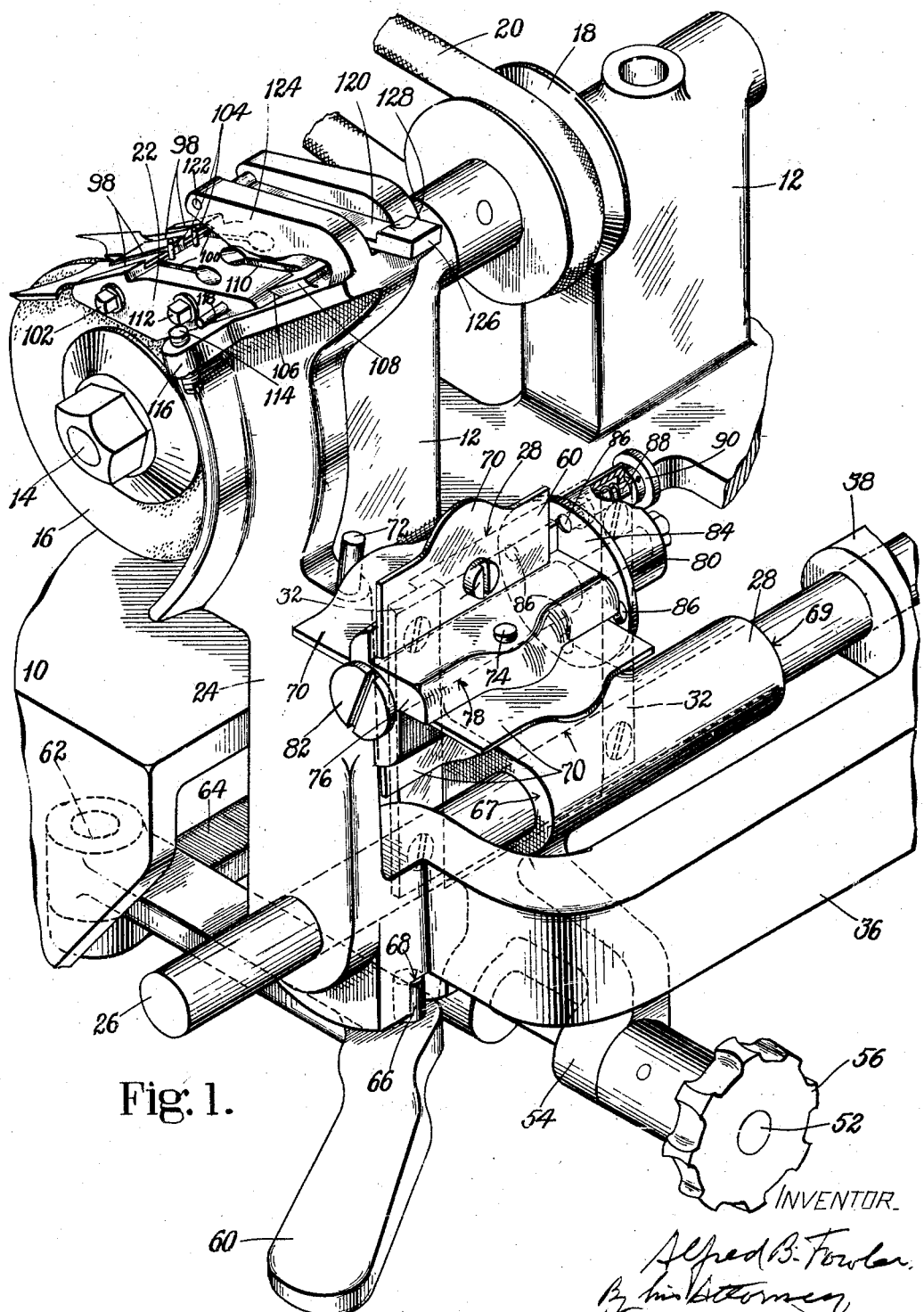
Fig. 1 is a perspective view of an abrading machine constructed in accordance with the present invention.
Figure 2:
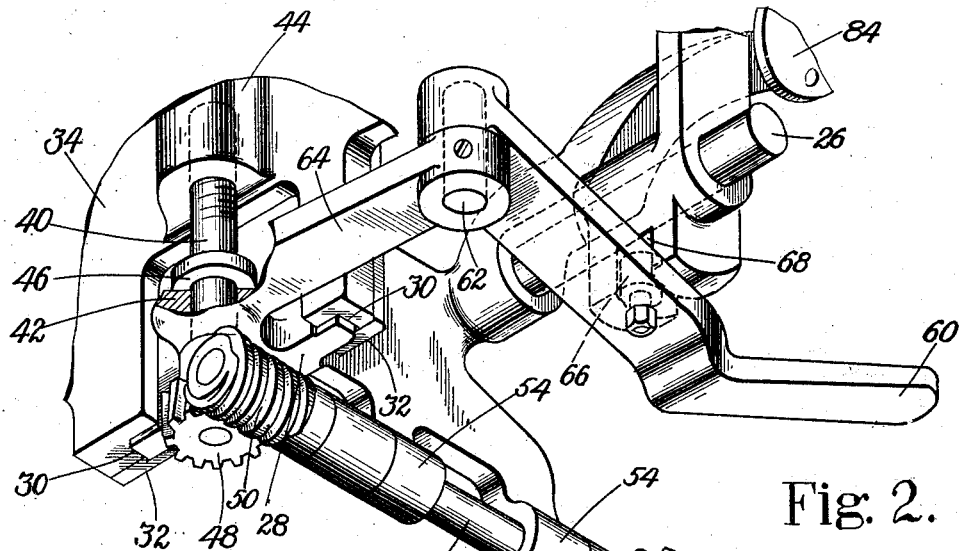
Fig. 2 is a perspective view of a portion of the machine showing particularly the means for adjusting the knife block support transversely with respect to the grinding wheel and for reciprocating said support.

Referring to the drawings, the operative parts of the improved abrading machine are supported upon a frame or bracket 10 which is adapted to be rigidly secured to the frame of a jointing machine or other machine the knives of which are to be ground. Rising from the bracket 10 are spaced standards 12, 12 in which is journaled the shaft 14 of a grinding wheel 16. A pulley 18 secured to the shaft 14 may be driven by means of a belt 20 from a shaft upon the machine to which the grinding device is attached.

The knives to be ground are secured to a knife block 22 carried by a movable support or lever 24 fulcrumed at its lower end for rocking movement upon a fixed guide rod 26 which is parallel to the axis of the grinding wheel. The guide rod 26 is carried by a slide 28 which is vertically adjustable in ways 30 formed behind gibs 32 secured to a depending portion 34 of the bracket 10. To enable the knife holder support 24 to slide on the guide rod 26 easily and without cramping, the lower end of the knife support is connected by a web 36 with a bearing 38 which encircles the guide rod at the opposite side of the slide 28 from the upwardly extending portion of the knife holder support 24.

The slide 28 is capable of being adjusted vertically to compensate for wearing away of the grinding wheel by means of a vertical screw shaft 40 which is mounted to turn freely in a lug 42 formed upon the rear face of the slide 28 and threaded at its upper end into an enlargement 44 on the depending portion 34 of the bracket 10. Longitudinal movement of the screw shaft 40 relatively to the slide 28 is prevented by means of a collar 46 and the hub of a worm wheel 48, said collar encircling the shaft 40 and bearing against the upper side of the lug 42, and said hub being also carried by said shaft and engaging the lower side of said lug. The worm wheel 48 is adapted to be turned by an intermeshing worm 50 carried by a horizontal shaft 52 journaled in bearing lugs 54, 54 depending from the forward extension of the slide 28. The worm shaft 52 extends forwardly from the screw shaft 40 and is provided with a hand wheel 56 by means of which it may be conveniently turned to effect vertical adjustment of the knife support. The worm 50 serves to lock the worm wheel 48 against accidental rotation and thus serves to maintain the vertical adjustment of the knife support.

The sliding movement of the knife holder support 24 on the guide rod 26 is effected by means of a hand lever 60 fulcrumed upon a stud 62 carried by an arm 64 formed as a rigid part of the slide 28. The hand lever 60 carries a pin 66 which is received in a groove 68 formed in the lower portion of the knife support 24. By swinging the lever 60 back and forth, the knives may be reciprocated across the periphery of the grinding wheel so that they may be ground as will hereinafter be described. The extent of sliding movement of the knife holder support 24 is limited by the engagement of portions of said support with stop faces 67, 69 on the slide 28.

The rocking movements of the knife support 24 for the purpose of moving the knives toward and from the grinding wheel, as they are also reciprocated transversely to the plane of the axis of the wheel, are under the control of one of a plurality of templets 70 carried by the slide 28, said templet being engaged by a follower 72 in the form of a pin projecting from the knife support 24. The templets 70 are secured, by means such as screws 74, to the radial arms of a turret 76 which is rotatably mounted upon a horizontal spindle 78 carried by a lug 80 projecting forwardly from the slide 28. The turret 76 is prevented from moving longitudinally upon the spindle 78 by means of the lug 80 on the spindle 78 which engages the opposite end of the turret. The several templets 70 are of different shapes to correspond with the curvatures of the cutting knives for different classes of work. To enable a selected templet to be positioned for cooperation with the follower 72, the turret 76 is formed with a disk-like flange 84 at the end adjacent to the supporting lug 80, said flange having perforations 86 corresponding to the several templets, and a spring-pressed plunger 88 carried by the lug 80 is adapted to engage the perforation 86 corresponding to a selected templet to lock the turret 76 against rotation, and thus to hold the selected templet rigidly in operative position. A head 90 on the plunger 88 enables the plunger to be readily withdrawn so that the turret 76 may be turned to bring another templet into operative relation to the follower 72.

Figure 5:
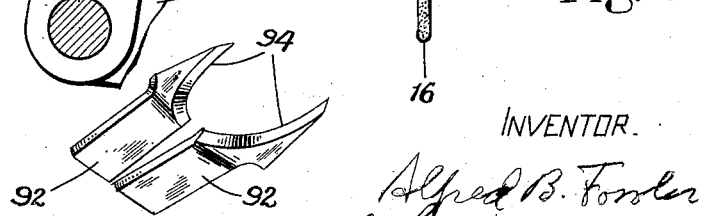
Fig. 5 is a perspective view of a pair of knives of the types which the present machine is adapted to grind.

A pair of knives are shown in Fig. 5. These knives, which are the so-called chopping knives of the jointing machine, are formed with flat shanks 92 and with cutting edges 94 which are curved to correspond with the transverse curvature of the trimming knives of the jointing machine. As shown, the portions of each cutting edge near the pointed extremity of the knife blade are sharply inclined and the curvature of each cutting edge near the end remote from its pointed extremity is quite abrupt. To enable the knives to operate upon the right and left sides of the shoe shanks, the cutting edges of the knives are oppositely curved, i. e., the curvature of the cutting edge of each knife is the reverse of the curvature of the cutting edge of the other knife.

The present machine is designed to grind a pair of right and left knives at each grinding operation. To this end, the knives are mounted close together with their shanks in lateral edgewise alinement upon the knife block or holder 22 and with the curved cutting edges of the knives opposed. With this relative arrangement of the knives the grinding operation commences at the pointed extremity of one of the knives and proceeds along the cutting edge to the inner end thereof as the knife is moved edgewise by lateral reciprocation of the knife support and simultaneously is rocked toward the grinding wheel by the action of the operatively positioned templet 70. Thereafter, by continuing the lateral sliding movement of the knife block support in the same direction the knife block support will be rocked to move the knife block away from the grinding wheel so that the other knife will be ground.

Figures 3, 4:
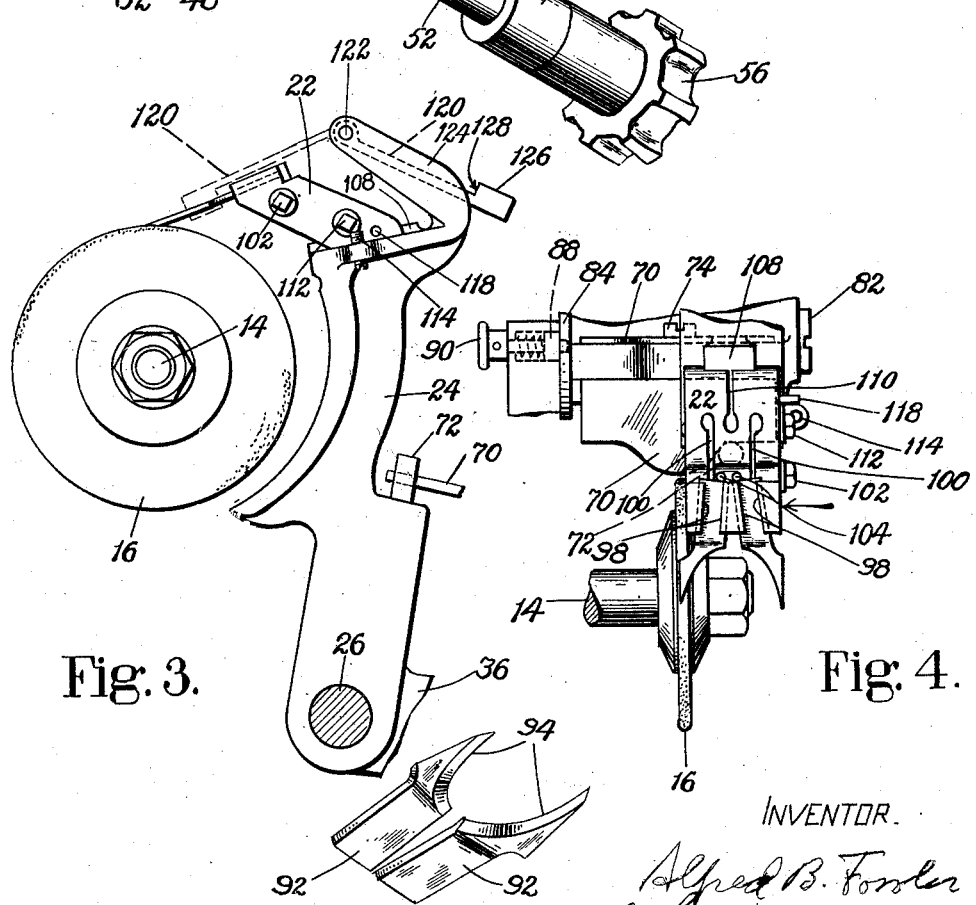
Fig. 3 is a side elevational view of the knife block support and the grinding wheel.
Fig. 4 is a fragmentary top plan view showing particularly the knife block, the knives, and the grinding wheel.

To enable the knives to be relatively arranged as above described, they are mounted and located upon the knife block 22 in the following manner. As shown in Figs. 1, 3 and 4, the upper face of the knife block or holder 22 has formed therein two pairs of dovetailed ways or grooves 98 which are adapted to receive the shanks of the knives. The knife block 22 is split lengthwise of the ways, as indicated at 100, 100, to enable the block to be contracted so that the beveled sides of each of the ways 98, 98 may be clamped against the respective edges of the knife shanks. This clamping action is effected by means of a clamp screw 102 which extends through the knife block below the ways 98, 98 and which is threaded into the further side of the knife block, the clamp screw serving to draw opposed sides of the ways together, thus providing a common means for clamping both knives in position upon the knife block.

To provide for the grinding of the knives of each pair so that they will be worn away uniformly by successive grinding operations, a pair of knife locating pins 104, 104 project from the upper face of the knife block in front of the ways 98. These pins are located in a plane parallel to the axis of the grinding wheel and are adapted to engage the free extremities of the knife shanks, as clearly shown in Fig. 4.

The knife block 22 is adjustable relatively to the knife block support 24 toward and from the grinding wheel and means is provided for locating the knife block relatively to its support to predetermine the point upon the grinding wheel which will be engaged by the knife. To permit adjustment of the knife block a dovetailed groove 106 is formed in the lower side of the block to receive a correspondingly shaped rib 108 on the knife block support 24. The knife block is split as shown at 110 so that the lower portion of the block may be contracted by means of a bolt 112 carried by the knife block and thus the knife block may be firmly clamped in adjusted position upon the knife block support. The portion of the support 24 to which the knife block is secured is inclined downwardly toward the grinding wheel, as shown clearly in Figs. 1 and 3, and in order to prevent the knife block from accidentally sliding down this inclined face and falling off from the support when the bolt 112 is loosened, a screw 114 is threaded through an ear 116 on the knife block support and is arranged to engage a pin 118 which projects from the side of the knife block.

The means for locating the knife block relatively to the support 24 comprises a gage 120 which is pivoted at 122 to a forwardly extending arm 124 on the knife support 24. The gage is formed with a hooked free extremity 126 forming a shoulder 128, for engagement with the opposed inner ends of the cutting edges of the knives when the gage is swung backwardly into the operative position shown in dotted lines in Fig. 3. The gage supporting arm 124 is bifurcated as shown in Fig. 1 to permit the gage, when not in use, to be swung forwardly into the inoperative position shown by full lines in Fig. 3, in which position it will not interfere with the grinding operation.

It will appear from an examination of Fig. 3 that the knives are located by the gage 120 so that their cutting edges will engage the periphery of the grinding wheel at points substantially in the vertical plane of the axis of the wheel. Consequently when the knife carrier 24 is adjusted vertically by means hereinbefore described to compensate for wearing away of the grinding wheel, the knives will still engage the periphery of the wheel in the same vertical plane and therefore will be presented at the same angle to the periphery irrespective of how much the wheel may be worn away. As a result, the same angle of bevel is obtained at the cutting edges of the knives whether the diameter of the grinding wheel is large or small. The so-called bevel imparted to the knives by the grinding wheel will not of course be absolutely flat but will be slightly curved to correspond to the curvature of the periphery of the grinding wheel; and while the degree of curvature of the knife edge will vary slightly as the diameter of the grinding wheel is reduced, this variation will be so slight as to be negligible in so far as it affects the operation of the knives.

In using the above-described machine for grinding a pair of chopping knives, the turret 76 is turned, if necessary, to bring into operative position the templet corresponding to the shape of the knives to be ground. The shanks of the knives are inserted in the grooves 98 in the knife block 92 and pushed forwardly in the grooves until the free ends of the shanks engage the gage pins 102 whereby the knives are located with their cutting edges symmetrically disposed or with corresponding points therein transversely alined. The clamp screw 102 is then tightened to clamp both knives rigidly in adjusted positions in the knife block. The gage 102 is then swung into operative position to bring the shoulder 128 in back of the adjacent inner ends of the cutting edges of the knives. The clamp screw 112 being loosened, the knife block is adjusted until the adjacent inner ends of the cutting edges are brought into engagement with the shoulder of the gage. The knives are thereby located with the outer end of one of the cutting edges in engagement with the periphery of the grinding wheel at a point in the vertical plane of the axis of the wheel. The knife block is then clamped to the knife block support by tightening the clamp screw 112, and the gage 120 is swung upwardly and forwardly into its inoperative position. The knife support is then moved back and forth upon the guide rod 26 by means of the hand lever 60. As the knife support is thus reciprocated, the folower 100 rides over the curved edge face of the templet and the knives are caused to be moved toward and from the grinding wheel, so that first one knife and then the other is ground progressively from end to end of its cutting edge. As hereinbefore stated the templet is shaped to cause both knives to be ground to the same contour and inasmuch as there are no abruptly curved or steeply inclined portions in the guiding face of the templet accuracy of grinding is insured.

The invention having been described, what I claim as new and desire to secure by Letters Patent of the United States is:

1. In a machine of the class described, an abrading element and a work holder arranged for relative oscillatory movement one toward or from the other and also for relative movement in a path transverse to that of said oscillatory movement, and a fixed templet for controlling said oscillatory movement, the abrading element and the templet being located at the same side of the axis of oscillation of the work carrier and the templet being located closer to said axis than the point of contact between the work and the abrading element.

2. In a machine of the class described, an abrading element and a work holder arranged for relative oscillatory movement one toward or from the other and also for relative movement in a path transverse to that of said oscillatory movement, and a fixed templet located at the same side of the axis of said oscillatory movement as the abraiding element for controlling said oscillatory movement, the work holder being arranged to present the work to the abrading element at a point substantially twice as far from said axis as said templet.

3. In a machine of the class described, the combination with a rotary abrading wheel, of a work carrier mounted to oscillate about an axis parallel to that of said wheel and also for reciprocation in a path parallel to said axis, a fixed templet located between said axis and the point of contact of the work with said wheel, and a follower carried by the work carrier for cooperating with said templet to control the oscillatory movement of the work carrier.

4. In a machine of the class described, a rotatable grinding wheel, a support for two knives having oppositely curved cutting edges, the knife support being movable relatively to the grinding wheel to effect grinding of the knives and also adjustable in a plane transverse to the axis of said wheel, and means for positioning the knives relatively to the knife support to locate the knife edges in alinement in a plane extending through the axis of the grinding wheel and substantially parallel to the plane of adjustment of the knife support.

5. In a machine of the class described, a rotatable grinding wheel, means movable relatively to the grinding wheel for supporting a knife to be ground, a single fixed templet for controlling the relative movement of the knife supporting means and the grinding wheel, and means for adjusting the knife supporting means and the templet in unison in a plane transverse to the axis of the grinding wheel to compensate for wearing away of the grinding wheel.

6. In a machine of the class described, a rotatable grinding wheel, a holder for two knives having oppositely curved cutting edges, the knife holder being movable relatively to said wheel to effect the grinding of said knives, and a templet for controlling said relative movement, the knife holder and the templet being adjustable in unison to compensate for the wearing away of the grinding wheel.

7. In a machine of the class described, a rotatable grinding wheel, a support movable relatively to the grinding wheel, a knife holder on said support adjustable toward and from said wheel, and a single fixed templet for controlling the movement of said support, said support and said templet being adjustable in unison transversely with respect to the axis of the grinding wheel to compensate for wearing away of the wheel.

8. In a machine of the class described, a rotatable grinding wheel, a holder for two knives having oppositely curved cutting edges, a support for said holder movable relatively to the grinding wheel, a templet for controlling the movement of said support, said support and said templet being adjustable in unison transversely with respect to the axis of the grinding wheel to compensate for wearing away of the wheel, and means for adjusting said support and said templet transversely with respect to the axis of the grinding wheel to compensate for wearing away of the wheel.

9. In a machine of the class described, a rotatable grinding wheel, a holder for two knives having oppositely curved cutting edges, a support for said holder movable relatively to the grinding wheel, a templet for controlling the movement of said support, said support and said templet being adjustable in unison transversely with respect to the axis of the grinding wheel to compensate for wearing away of the wheel, and means for adjusting said support and said templet transversely with respect to the axis of the grinding wheel to compensate for wearing away of the wheel, said adjusting means being constructed and arranged to lock said support and the templet in adjusted position when the adjusting means is idle.

10. In a machine of the class described, a rotatable grinding wheel, a frame, a slide mounted in the frame and adjustable transversely to the axis of said wheel, a guide rod carried by said slide and disposed in parallel relation to said axis, a support slidable on said rod and rockable thereon toward and from said wheel, a knife carried by said support and arranged to be traversed across the periphery of said wheel as said support slides upon said rod, and means for adjusting said slide to compensate for wearing away of the grinding wheel.

11. In a machine of the class described, a rotatable grinding wheel, a guide rod parallel to the axis of the grinding wheel, a support slidable on said rod and adapted to be rocked thereon toward and from the grinding wheel, a knife block secured to said support with provision for adjustment toward and from the grinding wheel, means for locating upon the block a pair of right and left chopping knives for a jointing machine with the inner ends of their cutting edges transversely alined, means for clamping the knives to the block, and a gage pivoted upon said support, said gage having a hooked end for engaging the knives at the opposed ends of their cutting edges to locate the knives in unison relatively to the grinding wheel and being adapted to be swung away from the knives when not in use.

12. In a machine of the class described, a rotatable grinding wheel, a support for two knives having oppositely curved cutting edges, the knife support being movable relatively to the grinding wheel to effect the grinding of the knives and being adjustable transversely with respect to the axis of the grinding wheel, and means for locating said knives relatively to said support with the points of grinding contact located in a plane passing through the axis of the wheel and parallel to the plane of said transverse adjustment of the knife support.

13. In a machine of the class described, a rotatable grinding wheel, a holder for two knives having oppositely curved cutting edges, a support for said holder, means for effecting relative movement of said wheel and support to grind the cutting edges of said knives, and a gage normally inoperatively positioned upon said holder and adapted to be moved into operative position to engage the opposed inner ends of the cutting edges of said knives to locate said knives in predetermined relation to said support.

14. In a machine of the class described, a grinding wheel and a knife holder relatively movable toward and from each other and also in a path parallel to the axis of the wheel, means for securing to said holder a plurality of knives, and a templet adapted to remain in a fixed position within the machine during the grinding of the plurality of knives and operative upon relative movement of the wheel and the knife holder in the path parallel to the axis of the wheel to control the grinding of said knives.

15. In a machine of the class described, a rotatable grinding wheel and a knife holder relatively movable toward and from each other and also in the direction of the axis of the grinding wheel, means for securing to said holder a pair of knives having oppositely curved cutting edges, means for locating said knives on the holder with their cutting edges in the same plane and the inner ends of said edges opposed, and a templet adapted to remain in one position within the machine during the grinding of both of said knives and operative upon relative movement of said wheel and said support to control the grinding of first one of the knives and then the other of the knives.

16. In a machine of the class described, a rotatable grinding wheel and a knife holder relatively movable one toward and from the other, said knife holder being adapted to support two knives of the same dimensions but having oppositely curved cutting edges, means for locating the knives in said holder with their cutting edges symmetrically opposed, and a templet for controlling the relative motion between the grinding wheel and knife holder, said templet having a contour geometrically dissimilar to that of the cutting edges of the knives.

17. In a machine of the class described, an abrading element and a work holder arranged for relatively oscillatory movement one toward or from the other and also for relative movement in a path transverse to that of said oscillatory movement, and a templet for controlling said oscillatory movement, said templet having a curvature which changes less rapidly per unit of length and the inclination of which at every corresponding point is less steep, than the work to be abraded.

18. In a machine of the class described, an abrading element and a work holder arranged for relatively oscillatory movement one toward or from the other and also for relative movement in a path transverse to that of said oscillatory movement, and a templet for controlling said oscillatory movement, the difference in height between the high and low points of the templet being only substantially one-half as great as the difference in height between the corresponding points of the edge of the work, while the linear distances between corresponding points of the templet and work are equal.

In testimony whereof I have signed my name to this specification.

ALFRED B. FOWLER.